UNITED STATES PATENT OFFICE.

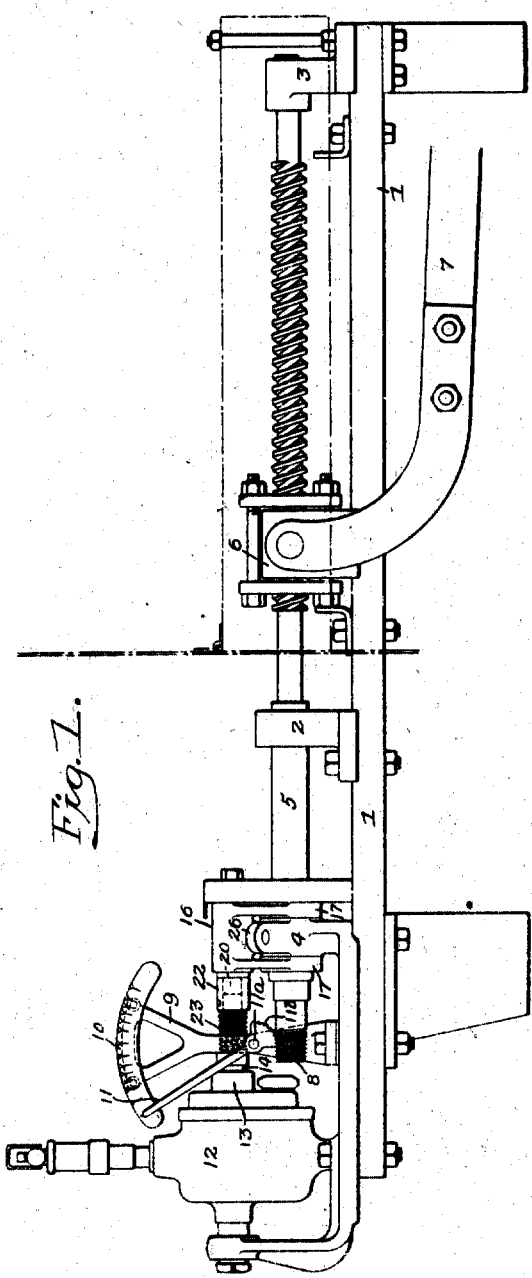

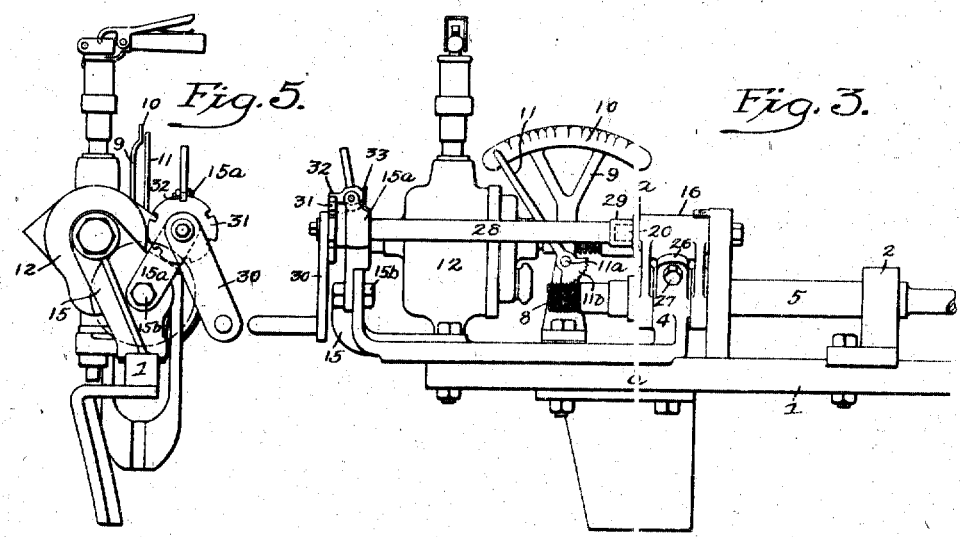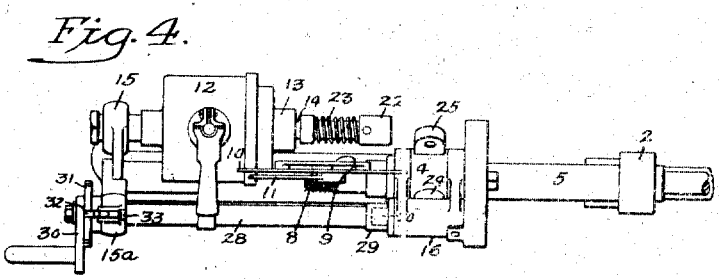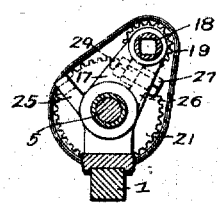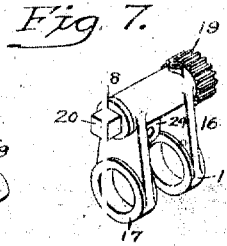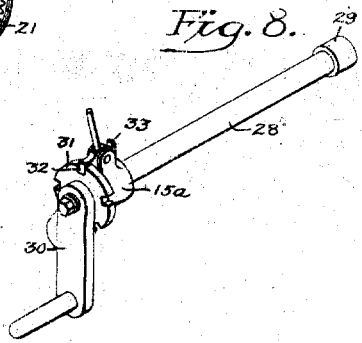

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

SCREW REVERSE VALVE MECHANISM FOR LOCOMOTIVES.

1,221,604.      Specification of Letters Patent.      Patented Apr. 3, 1917.

Application filed December 8, 1915. Serial No. 65,792.

*To all whom it may concern:*

Be it known that I, KENNETH RUSHTON, a citizen of the United States, residing in Philadelphia, Pennsylvania, have invented certain Improvements in Screw Reverse Valve Mechanism for Locomotives, of which the following is a specification.

This invention relates to certain improvements in screw reverse valve mechanism for locomotives for which a patent was granted to me on the sixth day of July, 1915, No. 1,145,800.

One object of the present invention is to provide means whereby the reverse gear can be turned by hand in the event of an accident to the power mechanism.

Another object of the invention is to provide an indicator which can be arranged in front of the operator so as to indicate the travel of the screw on the shaft.

In the accompanying drawings:

Figure 1 is a side view of my improved screw reverse gear showing the power mechanism coupled thereto;

Fig. 2 is a plan view of Fig. 1;

Fig. 3 is a side view, similar to one portion of Fig. 1, showing the hand operating mechanism;

Fig. 4 is a plan view of Fig. 3;

Fig. 5 is an end view;

Fig. 6 is a sectional view on the line a—a, Fig. 3;

Fig. 7 is a perspective view of the swinging bearing, and

Fig. 8 is a detached perspective view of the operating handled shaft.

Referring to the drawings, 1 is the frame arranged to be secured in any suitable manner to the locomotive structure. 2, 3, and 4 are bearings for the screw shaft 5. 6 is the nut which is connected to the operating rod 7 which, in turn, is connected to the reverse mechanism of the locomotive. The bearing 4 is part of the housing for the motor 12. On the end of the screw shaft 5 is cut a fine thread 8 and projecting from the frame 1 is an arm 9 carrying a segment 10. 11 is a hand pivoted at 11ª and having a toothed segmental portion 11ᵇ meshing with the screw thread 8 so that as the screw shaft 5 is turned the hand will indicate the location of the nut 6, as it will be understood that the nut is some distance from the engineer's station in the cab and by locating the segment and hand at the engineer's station he can accurately adjust the nut on the screw shaft.

12 is a motor, in the present instance, an air controlled motor, which is firmly secured to the frame 1 and carries a bearing 13 for the motor shaft 14, the rear end of this shaft being also carried by a bearing 15 secured to the frame of the machine. Mounted on the screw shaft 5 at the bearing 4 is a swinging bearing 16, one arm 17 extending on one end of the bearing 4 and the other at the opposite end, as clearly shown in the drawings. This swinging bearing 16 carries a shaft 18 having a pinion 19 at one end and preferably squared and having at the other end a squared portion 20. The pinion 19 meshes with a gear wheel 21 secured to the screw shaft 5. Adapted to slide on the shaft 14 is a coupling sleeve 22 having a portion shaped to engage the squared portion 20 of the shaft 18 when in its projected position, as illustrated in Figs. 1 and 2. Back of this coupling is a spring 23 which tends to hold the coupling in engagement with the shaft 18 so that when motion is imparted from the motor to the shaft 14 it is transmitted through the coupling 22, shaft 18, pinion 19, and gear 21 to the screw shaft 5 so that as the shaft is turned the nut 6 will travel thereon and will operate the reverse mechanism.

On the swinging bearing is a central perforated projection 24 and of the bearing 4 are two perforated lugs 25 and 26. When the parts are in the position illustrated in Figs. 1 and 2 and the mechanism is driven by the motor, a bolt 27 secures the swinging bearing 16 to the lug 25, but in the event of an accident happening to the motor or to the mechanism directly connected therewith and it is desired to turn the screw by hand, then the bolt 27 is removed and the coupling 22 is withdrawn from engagement with the end 20 of the shaft 18, and the swinging bearing is turned to the position illustrated in Fig. 6, the pinion on the shaft remaining in mesh with the gear.

An operating shaft 28 is then mounted on the machine. This shaft has a squared socket 29 which is coupled to the end 20 of the shaft 18 and has a bearing 15ª which is secured by a bolt 15ᵇ to the bearing 15, as illustrated in Fig. 3. On this shaft is a handle 30 and on turning this handle motion will be imparted to the screw shaft 5 through the shaft 28, coupling 29, shaft 18, pinion 19 and gear wheel 21.

On the shaft 28, directly back of the handle, is a notched disk 31 in the present instance, and on the bearing 15ª is a pivoted pawl 32 held in either of its two positions by a spring 33, so that when the shaft is turned to shift the nut 6 it can be locked by the pawl 32 engaging the notched disk.

In some instances the bearing 15ª may form an integral portion of the bearing 15 and may have a socket adapted to receive the handled shaft.

It will be seen, by the above arrangement, that the screw reverse gear can be driven by power or by hand, as desired.

I claim:

1. The combination in a reverse gear for locomotives, of a shaft for controlling the reverse mechanism; a motor; a shaft driven thereby; a hand operated shaft; an intermediate shaft; and a swinging bearing for said intermediate shaft arranged to be brought in line with either the motor driven shaft or the hand shaft.

2. The combination in a reverse gear for locomotives, of a screw shaft for controlling the reverse mechanism; a bearing for the shaft having two lugs thereon; a swinging bearing mounted on the screw shaft at said bearing; an intermediate shaft carried by the swinging bearing; a pinion on said intermediate shaft; a gear wheel on the screw shaft with which the pinion meshes; a perforated projection on the swinging bearing; power and hand means for turning said intermediate shaft; and a bolt for securing said swinging bearing to either of the lugs on the main bearing.

3. The combination in a reverse gear for locomotives, of a screw shaft; a motor driven shaft; a detachable hand operated shaft; a swinging bearing; and an intermediate shaft carried thereby and arranged to be shifted either in line with the power driven shaft or the hand operated shaft and to be coupled to either shaft so that in the event of an accident to the power mechanism the reverse mechanism can be operated by hand.

KENNETH RUSHTON.